(12) United States Patent
Nesori et al.

(10) Patent No.: US 8,873,202 B2
(45) Date of Patent: Oct. 28, 2014

(54) HEAD GIMBAL ASSEMBLY IN WHICH FLEXURE SWING IS SUPPRESSED AND DISK DEVICE INCLUDING THE SAME

(71) Applicant: Kabushiki Kaisha Toshiba, Tokyo (JP)

(72) Inventors: Hirofumi Nesori, Tokyo (JP); Yasutaka Sasaki, Kanagawa (JP); Takafumi Kikuchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/915,496

(22) Filed: Jun. 11, 2013

(65) Prior Publication Data

US 2014/0118863 A1   May 1, 2014

(30) Foreign Application Priority Data

Oct. 30, 2012 (JP) ................................. 2012-239559

(51) Int. Cl.
*G11B 5/48* (2006.01)
*G11B 21/21* (2006.01)

(52) U.S. Cl.
CPC .................................... *G11B 5/4826* (2013.01)
USPC .................................... 360/244.5; 360/245.9

(58) Field of Classification Search
USPC ........... 360/245.8, 245.9, 264.2, 244.5, 244.2
See application file for complete search history.

(56) References Cited

U.S. PATENT DOCUMENTS

| | | | |
|---|---|---|---|
| 6,055,133 A * | 4/2000 | Albrecht et al. ........... | 360/245.2 |
| 6,353,515 B1 * | 3/2002 | Heim ......................... | 360/245.9 |
| 7,009,814 B2 * | 3/2006 | Takikawa et al. .......... | 360/245.9 |
| 7,099,117 B1 * | 8/2006 | Subrahmanyam et al. | 360/245.9 |
| 7,440,236 B1 * | 10/2008 | Bennin et al. ............. | 360/294.4 |
| 7,688,549 B2 * | 3/2010 | Watadani et al. .......... | 360/244.5 |
| 7,751,152 B2 * | 7/2010 | Hanya et al. ............. | 360/265.9 |
| 8,064,168 B1 * | 11/2011 | Zhang et al. .............. | 360/245.4 |
| 8,248,734 B2 | 8/2012 | Fuchino | |
| 8,300,364 B2 * | 10/2012 | Ogawa ....................... | 360/245.9 |
| 8,351,160 B2 * | 1/2013 | Fujimoto ................... | 360/245.8 |
| 8,379,349 B1 * | 2/2013 | Pro et al. ................... | 360/245.9 |
| 8,542,465 B2 * | 9/2013 | Liu et al. ................... | 360/294.4 |
| 8,553,364 B1 * | 10/2013 | Schreiber et al. ......... | 360/245.9 |
| 8,582,244 B2 * | 11/2013 | Arai ........................... | 360/245.9 |
| 8,693,145 B2 * | 4/2014 | Miura et al. ............... | 360/245.9 |
| 2002/0171968 A1 | 11/2002 | Nakagawa | |
| 2006/0039085 A1 * | 2/2006 | Nakagawa ................ | 360/245.9 |
| 2006/0221504 A1 * | 10/2006 | Hanya et al. .............. | 360/245.9 |
| 2007/0146935 A1 * | 6/2007 | Minami et al. ............ | 360/245.9 |

FOREIGN PATENT DOCUMENTS

| | | |
|---|---|---|
| JP | H02-089212 | 3/1990 |
| JP | 2002074871 A | 3/2002 |
| JP | 2009295195 A | 12/2009 |

* cited by examiner

*Primary Examiner* — Brian Miller
(74) *Attorney, Agent, or Firm* — Patterson & Sheridan LLP (57) ABSTRACT

A head gimbal assembly includes a base plate, a load beam, a first end of which is supported by the base plate, a magnetic head supported at a second end of the load beam, a flexure including a plurality of wirings electrically connected to the magnetic head, the flexure extending from a surface of the base plate to an edge of the base plate, an adhesive applied in a space formed between the surface of the base plate and a surface of the flexure facing the surface of the base plate to bond the flexure to the base plate and to the edge of the base plate.

21 Claims, 8 Drawing Sheets

HEAD GIMBAL ASSEMBLY IN WHICH FLEXURE SWING IS SUPPRESSED AND DISK DEVICE INCLUDING THE SAME

CROSS-REFERENCE TO RELATED APPLICATION(S)

This application is based upon and claims the benefit of priority from Japanese Patent Application No. 2012-239559, filed on Oct. 30, 2012, the entire contents of which are incorporated herein by reference.

FIELD

Embodiments of the present application relate to a head gimbal assembly used in a disk device and a disk device including the head gimbal assembly.

BACKGROUND

Recently, as an external recording device of a computer and an image recording device, a disk device, such as a magnetic disk device, an optical disk device, etc., has been widely used.

The magnetic disk device generally includes a magnetic disk installed in a case, a spindle motor that supports and rotationally drives the magnetic disk, and a head gimbal assembly (HGA). The head gimbal assembly includes a suspension that is attached to a tip end part of an arm, a magnetic head that is supported by the suspension, and a flexure (wiring trace) electrically connected to the magnetic head. The flexure is drawn from a load beam, which is one component of the suspension, to an external side of the suspension. The suspension includes a base plate, which is firmly attached to the tip end of the arm, and the load beam, which is firmly attached to the tip end of the base plate.

Recently, an HGA including a piezoelectric material arranged on the base plate has been provided. When a voltage is applied to the piezoelectric material, the piezoelectric material deforms. Due to this movement the load beam swings, and the magnetic head attached to the load beam also swings. Thus, by controlling a voltage applied to the piezoelectric material, the movement of the magnetic head can be controlled.

In the HGA as described above, a flexure is configured as a thin laminated plate. However, due to the thinness, the flexure is highly susceptible to wind generated by rotation of the magnetic disk. When the flexure swings as a result of windage, the entire suspension oscillates, and as a result accurate positioning of the magnetic head may be compromised.

DETAILED DESCRIPTION

Embodiments of the present application provide a head gimbal assembly and a disk device that are capable of suppressing swing of a flexure due to windage and increasing the accuracy of head positioning. One of head gimbal assemblies disclosed in the application includes a base plate, a load beam, a first end of which is supported by the base plate, a magnetic head supported at a second end of the load beam, a flexure including a plurality of wirings electrically connected to the magnetic head, the flexure extending from a surface of the base plate to an edge of the base plate, an adhesive applied in a space formed between the surface of the base plate and a surface of the flexure facing the surface of the base plate to bond the flexure to the base plate and to the edge of the base plate.

Hereinafter, a hard disk drive (HDD) used for a magnetic disk device is explained in detail with reference to the drawings according to the embodiments.

First Embodiment

Figure 1:
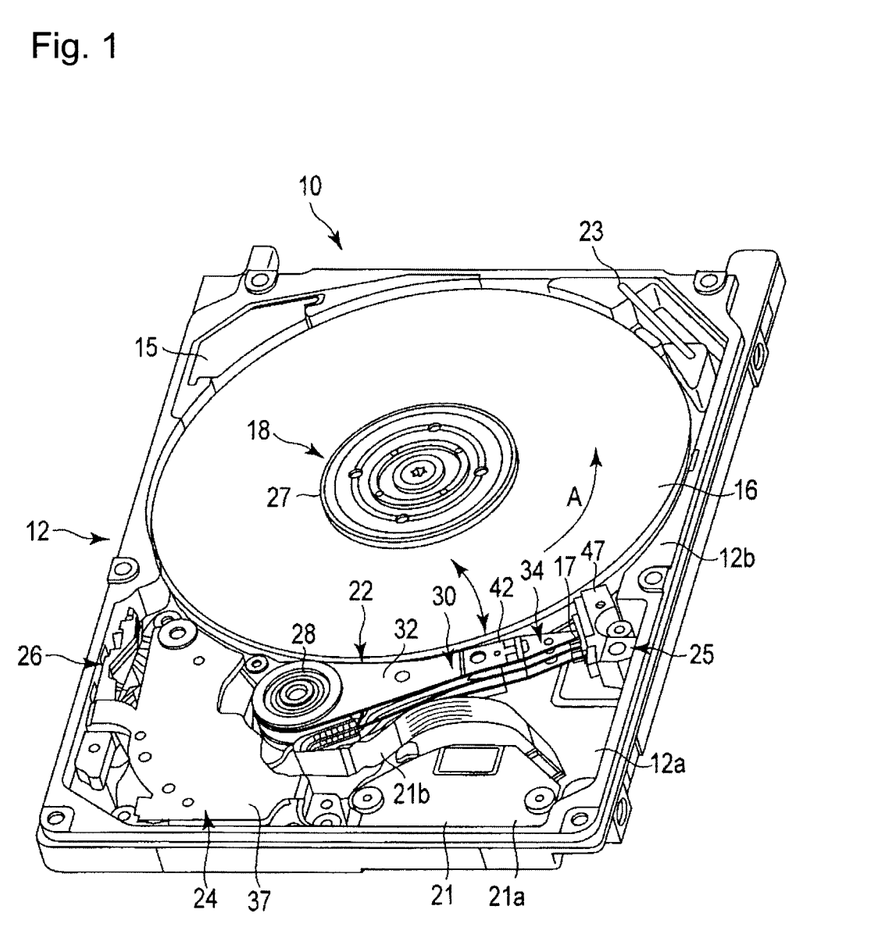
FIG. 1 is a perspective view of a hard disk drive (HDD) according to a first embodiment with its top cover opened.

FIG. 1 illustrates an internal structure of an HDD with its top cover opened. As illustrated in FIG. 1, the HDD includes a case 10. The case 10 includes a base 12, which is formed in a rectangular box shape without an upper surface, and a top cover (not illustrated in FIG. 1) that closes an upper opening of the base and that is screwed to the base with a plurality of screws. The base 12 includes a bottom wall 12a, which is formed in a rectangular shape, and a side wall 12b, which is formed along a periphery of the bottom wall.

In the case 10, two magnetic disks 16, which are used as recording media, and a spindle motor 18, which is used as a driving unit that supports and rotates the magnetic disks, are disposed. The spindle motor 18 is provided on the bottom wall 12a. Each of the magnetic disks 16 has a diameter of 65 mm (2.5 inches) and has magnetic recording layers on its upper and lower surfaces. While the magnetic disks 16 and a hub (not shown in FIG. 1) of the spindle motor 18 are coaxially fit to each other, the magnetic disks 16 are clamped by a clamp spring 27 and firmly attached to the hub. As a result, the magnetic disks 16 are supported in a position parallel to the bottom wall 12a of the base 12. Then, the magnetic disks 16 are rotated by the spindle motor 18 at a predetermined speed.

In the case 10, a plurality of magnetic heads 17, which record information to and reproduce information of the magnetic disks 16, and a head stack assembly (hereinafter HSA) 22, which supports these magnetic heads movably with respect to the magnetic disks 16, are disposed. Also, in the case 10, a voice coil motor (hereinafter VCM) 24, a ramp load mechanism 25, a latch mechanism 26, and a board unit 21 including a preamplifier are disposed. The voice coil motor 24 revolves and positions the HSA 22. The ramp load mechanism 25 holds the magnetic heads 17 in an unload position separated from the magnetic disks 16 when the magnetic heads 17 move to outermost circumferences of the magnetic disks 16. The latch mechanism 26 holds the HSA 22 in an evacuation position when a shock, or the like, affects the HDD. Here, the latch mechanism 26 is not necessarily limited to a mechanical one, and a magnetic latch may be used as the latch mechanism 26.

In an external surface of the bottom wall 12a of the base 12, a print circuit board (not shown in FIG. 1) is screwed. The print circuit board controls operations of the spindle motor 18, the VCM 24, and the magnetic heads 17, via the board unit 21. On the side wall of the base 12, a circulation filter 23, which catches dusts generated in the case 10 by the operation of movable parts, such as the magnetic disks 16 and the spindle motor 18, is disposed and is positioned adjacent to an outer periphery of the magnetic disks 16. Also, on the side wall of the base 12, a ventilation filter 15, which catches dusts in the air flowing into the case 10, is disposed.

As illustrated in FIG. 1, the HSA 22 includes a rotatable bearing unit 28, four head gimbal assemblies (hereinafter HGA) 30, which are attached to the bearing unit 28 and are stacked, and spacer rings (not illustrated) disposed in the stacked HGAs 30.

The bearing unit 28 includes a pivot installed in a standing state on the bottom wall 12a of the base 12 near outer circumferences of the magnetic disks 16, and a sleeve, which is formed in a cylinder shape and supported by the pivot. The sleeve can rotate around the pivot because bearings are provided between the pivot and the sleeve.

Figure 2:
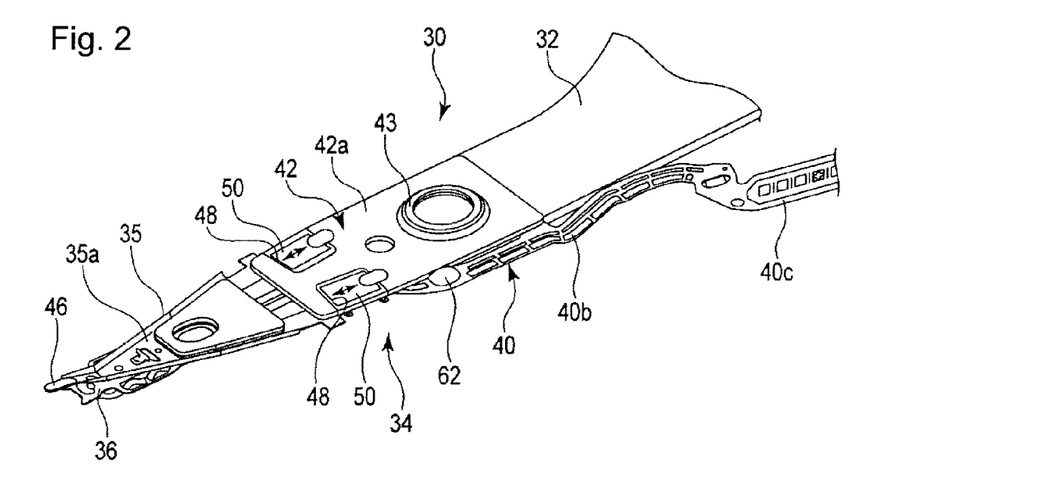
FIG. 2 is a perspective view of a head gimbal assembly of the HDD.
Figure 3:
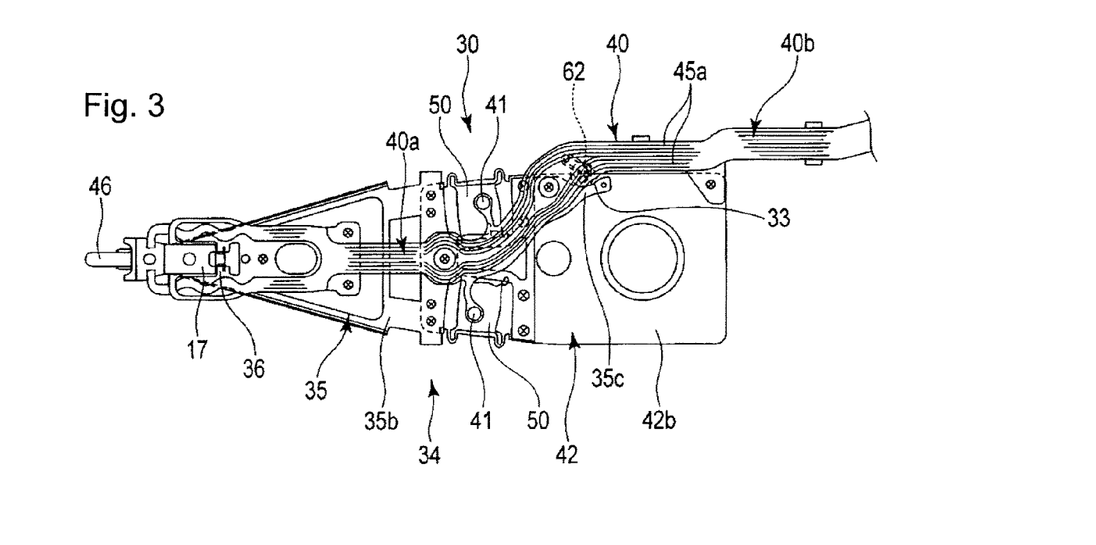
FIG. 3 is a plan view of the head gimbal assembly.

FIG. 2 is a perspective view of the HGA 30, and FIG. 3 is a plan view of the HGA 30 from a side of the magnetic head 17. As illustrated in FIGS. 1-3, each of the HGAs 30 includes an arm 32 extended from the bearing unit 28, a suspension 34 extended from the arm 32, and the magnetic head 17 supported at the extended end (a tip end) of the suspension 34.

The arm 32 is formed in a narrow and long plate shape and comprised of stainless steel, aluminum, etc., for example. At the tip end of the arm 32, a bearing surface having a hole (not illustrated) is formed. The suspension 34 includes a base plate 42 extending from the arm 32, a load beam 35, which is formed in a narrow and long plate spring shape, and a gimbal 36 attached to the extended end of the load beam 35. The base plate 42 is formed in a nearly rectangular shape and is stacked on a root end (i.e. an end distal from the gimbal 36) of the load beam 35. The magnetic head 17 is firmly attached onto the gimbal 36. Since the gimbal 36 is attached to the load beam 35, the magnetic head 17 is indirectly supported by the load beam 35.

The base plate 42 includes a first surface 42a and a second surface 42b, which is opposite to the first surface 42a. The base plate 42 includes a circular opening adjacent to its root end (i.e. the end close to the arm 32) and a protrusion part 43, which is formed in a ring shape and positioned around the circular opening. The protrusion part 43 protrudes from the first surface 42a of the base plate 42. The second surface 42b of the base plate 42 is disposed on the arm 32 in an overlapping state so that the protrusion part 43 fits in the circular opening. As a result, the base plate 42 is joined to the tip end of the arm 32.

The load beam 35 includes a first surface 35a and a second surface 35b, which is opposite to the first surface 35a. The first surface 35a of the load beam 35 is disposed on the second surface 42b of the base plate 42 in an overlapping state, and is firmly attached to the base plate 42 by welding at plural points. The load beam 35 is formed in a shape of triangle. The width of the bottom end of the load beam 35 is substantially the same as the width of the base plate 42.

Figure 4:
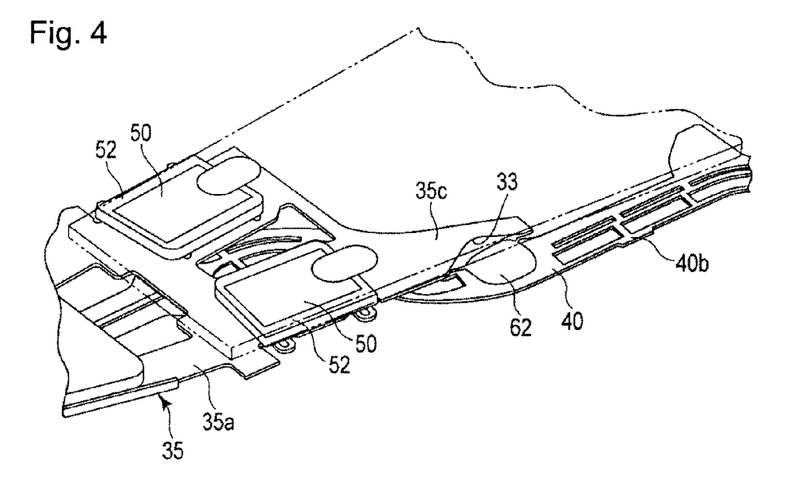
FIG. 4 is a perspective view of a bonding part of a load beam, a base plate, and a flexure in the head gimbal assembly.
Figure 5:
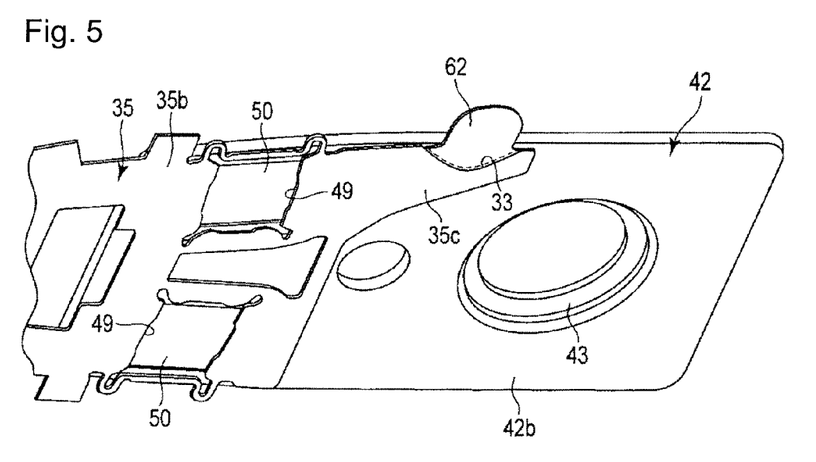
FIG. 5 is a perspective view of the bonding part of the load beam and the base plate, in which the drawing of the flexure is omitted.

FIG. 4 is a perspective view of a bonding part of a load beam, a base plate, and a flexure. FIG. 5 is a perspective view of the bonding part of the load beam and the base plate, in which the drawing of the flexure is omitted.

As illustrated in FIG. 3 and FIG. 5, the load beam 35 has an extension part 35c extending from a bottom end of the load beam 35 along a side rim of the base plate 42. Further, a recessed part (notch) 33 is formed on a side rim of the extension part 35c, and this recessed part 33 is formed is an almost semicircular shape. As described later, the recessed part 33 forms a space (pocket) to be filled with an adhesive. Here, the shape of the recessed part 33 is not limited to the semicircular shape. A triangular shape, a rectangular shape, an oval shape, etc., are also applicable.

As illustrated in FIG. 2 and FIG. 5, two openings 48 are formed on the side rim of the tip end of the base plate 42 to perform as mounting parts for piezoelectric elements 50. In these openings 48, two piezoelectric elements 50 are disposed and are firmly fixed to the base plate 42 by an adhesive 52. Also, two openings 49 are formed in the load beam 35, and these openings 49 respectively face the piezoelectric elements 50.

Each of the piezoelectric elements 50 stretches along a longitudinal direction of the suspension 34 along arrows illustrated in FIG. 2 in response to application of a voltage. By driving these two piezoelectric elements 50 such that stretching directions of these piezoelectric elements 50 are opposite to each other, the load beam 35 swings and this enables the magnetic head 17 to change its position.

As illustrated in FIG. 2 and FIG. 3, the HGA 30 includes the flexure (wiring trace) 40, which is formed in a narrow and long belt shape. In the flexure 40, a front end (tip end) 40a is disposed on the gimbal 36, the load beam 35, and the base plate 42, and a rear part (root end) 40b extends to an external side of the load beam 35 and the base plate 42 from their side rims along the side rim of the arm 32.

Figure 10:
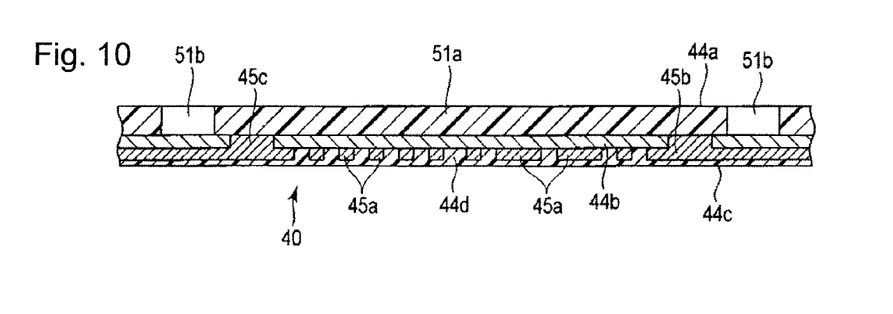
FIG. 10 is a sectional view of the flexure along a line B-B shown in FIG. 9.

FIG. 10 is a sectional view of the flexure 40. As illustrated in FIG. 2, FIG. 3, and FIG. 10, the flexure 40 forms a laminated plate in a narrow and long belt shape. The flexure 40 includes a metal thin plate (under layer) 44a, an insulation layer 44b, a conductive layer (wiring pattern) 44c, and a protective layer (insulation layer) 44d. The metal thin plate 44a is made of a stainless steel, etc. and constitutes a base of the flexure 40. The insulation layer 44b is formed on the metal thin plate 44a. The conductive layer 44c is formed on the insulation layer 44b and constitutes a plurality of wirings 45a. The protective layer 44d covers and protects the conductive layer 44c. As illustrated in FIG. 2 and FIG. 3, the front end 40a of the flexure 40 is pasted or pivot-welded to the load beam 35 with the metal thin plate 44a in contact with the second surface 35b. A tip of the metal thin plate 44a is formed to perform as the gimbal 36. Thus, the flexure 40 extends from the magnetic head 17 to the bottom end of the load beam 35 through the center of the load beam 35 and further extends to the side rims of the base plate 42 through the extension part 35c of the load beam 35 and on the recessed part 33. It follows then that a part of the flexure 40 overlaps the recessed part 33 of the load beam 35.

The extension part 40b of the flexure 40 is guided from the side rims of the load beam 35 and the base plate 42 to their external sides and extends to the vicinity of the bearing unit 28 along the arm 32. Then, a connection part 40c of the flexure 40, which is an end that is opposite to the gimbal 36, is connected to a main FPC 21b, which will be described later.

Figure 8:
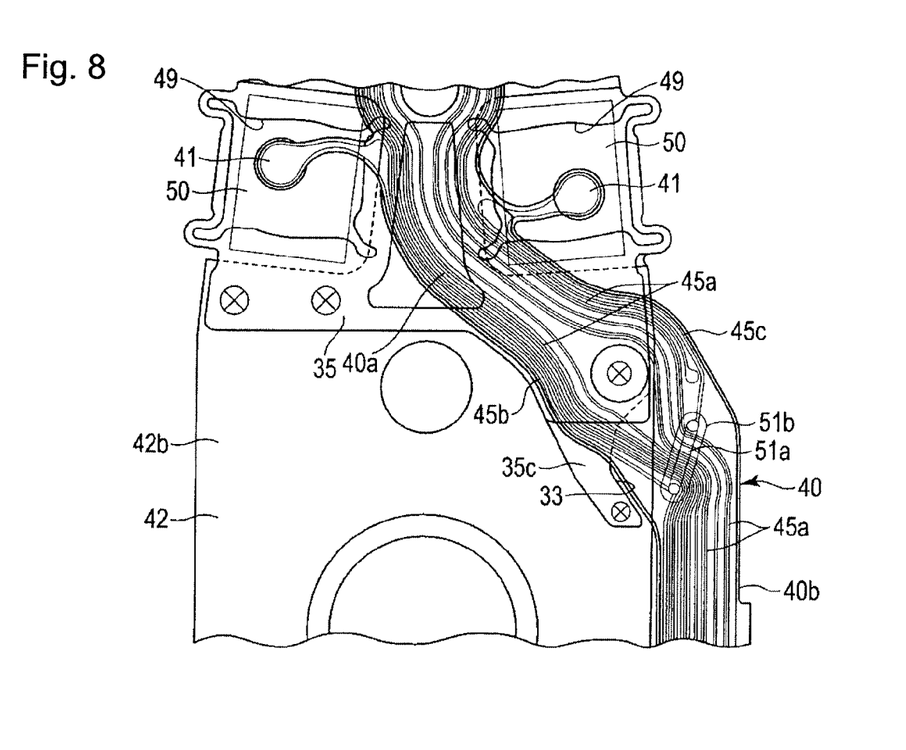
FIG. 8 is an enlarged plan view of wirings of the flexure, the base plate, and the load beam in the head gimbal assembly.
Figure 9:
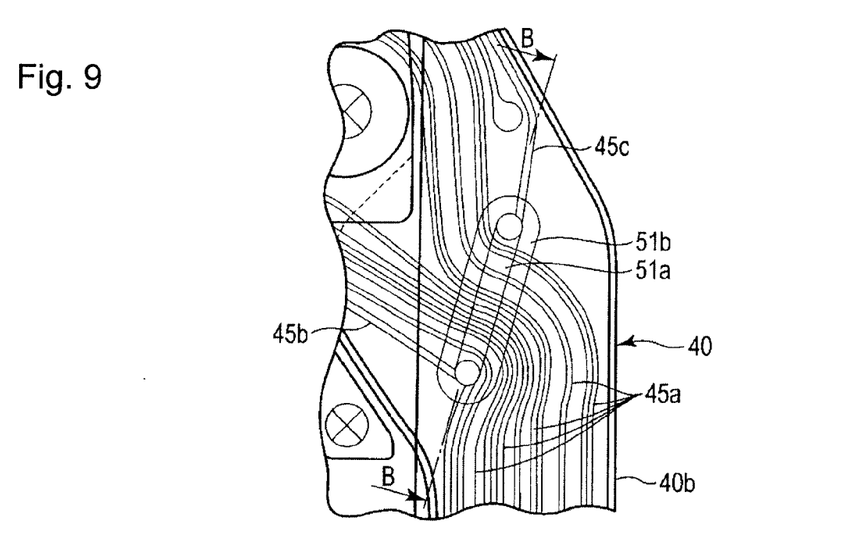
FIG. 9 is a plan view of a jumper (island connection part) of the flexure.

FIG. 8 and FIG. 9 illustrate a wiring pattern of the flexure 40 and a bridge part of the flexure 40. FIG. 10 shows a sectional view of the bridge part.

As illustrated in FIG. 3 and FIG. 8, the conductive layer 44c (not labeled in FIGS. 3, 8) of the flexure 40 forms plural lines of wirings 45a arrayed in the width direction of the flexure 40. The wirings 45a extend over an entire length of the flexure 40. One end of the wirings 45a are electrically connected to the magnetic head 17, and the other ends are electrically connected to a connection terminal (connection pad) disposed at the connection part 40c. Thus, the magnetic head 17 is electrically connected to the main FPC 21b through the wirings 45a of the flexure 40. Further the magnetic head 17 is connected to a main body 21a through the main FPC 21b.

The conductive layer 44c of the flexure 40 includes, on both ends of the flexure 40 in the width direction, two lines of electrification wirings 45b and 45c, which are disposed on both sides of the wirings 45a, and two driving pads 41 extending from these wirings 45b and 45c toward right and left sides of the flexure 40. The two driving pads 41 are respectively electrically connected to the corresponding piezoelectric elements 50. Also, the electrification wiring 45b extends from the driving pad 41 to the connection part 40c of the flexure 40 and is connected to the connection terminal. The electrification wiring 45c extends from the driving pad 41 to a middle part of the flexure 40, which is an end of the extension part 40b close to the base plate 42.

As illustrated in FIG. 8, FIG. 9 and FIG. 10, the flexure 40 includes a bridge (jumper) 51a that electrically connects the electrification wiring 45b and the electrification wiring 45c. The bridge 51a is formed in a narrow and long shape by using a portion of the metal thin plate 44a of the flexure 40. In the metal thin plate 44a, a periphery of the bridge 51a is cut off and a separation groove 51b is formed in a ring shape. Thus, the bridge 51a is formed in an island shape surrounded by the separation groove 51b and, therefore, electrically separated from the rest of the metal thin plate 44a. The bridge 51a crosses over the plurality of wirings 45a, and both ends of the bridge 51a are electrically connected to the electrification wirings 45b and 45c. Thereby, the electrification wiring 45b is electrically connected to the electrification wiring 45c via the bridge 51a. Therefore, driving signals transmitted from the connection part 40c of the flexure 40 is supplied to the two piezoelectric elements 50 through the electrification wiring 45b, bridge 51a, and the electrification wiring 45c.

Figure 6:
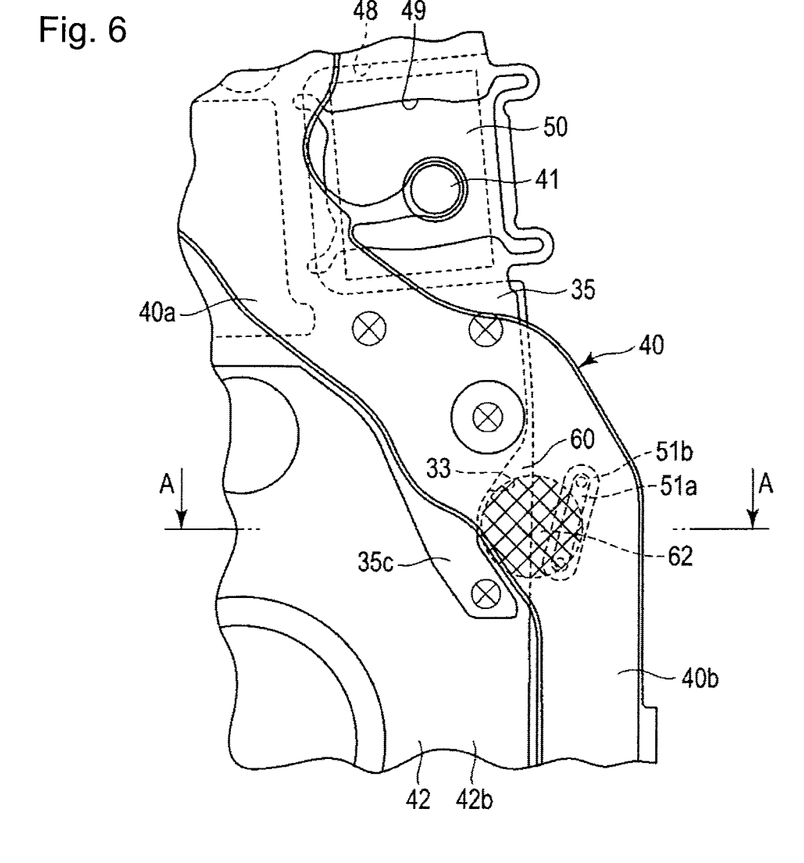
FIG. 6 is an enlarged plan view of the bond part of the flexure, the base plate, and the load beam.
Figure 7:
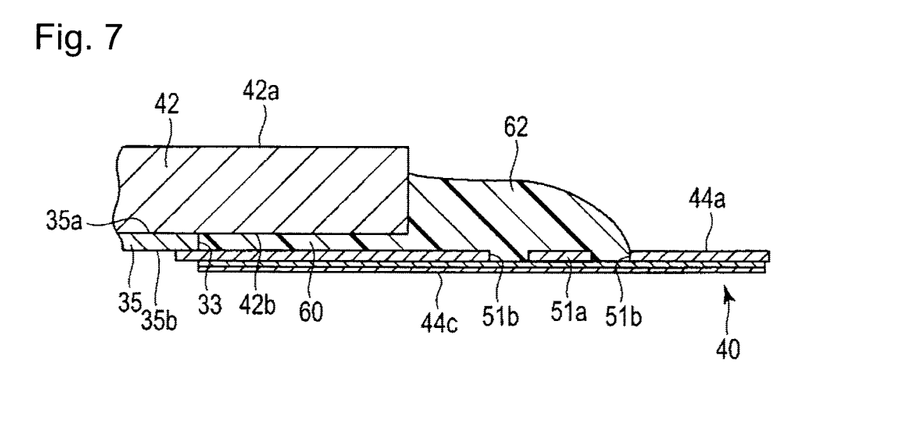
FIG. 7 is a sectional view of the bonding part of the head gimbal assembly along a line A-A shown in FIG. 6.

Next, a bonding of the flexure 40, the base plate 42, and the load beam 35 by an adhesive will be explained. FIG. 6 shows an enlarged plan view of the bonding part of the flexure 40, the base plate 42, and the load beam 35. FIG. 7 shows a sectional view of the bonding part of the HGA along the line A-A of FIG. 6.

As illustrated in FIG. 6 and FIG. 7, the load beam 35 includes the extension part 35c extending along the side rim of the base plate 42, and forms the recessed part (notch) 33 at the side rim of the extension part 35c. The recessed part 33 is recessed inward from the side rim of the extension part 35c. The flexure 40 is disposed to overlap the extension part 35c and the recessed part 33. Therefore, a pocket (crevice) 60 is formed between the base plate 42 and the flexure 40 due to a space created by the recessed part 33, and the pocket 60 is open toward the side rim of the load beam 35.

As illustrated in FIG. 2 and FIG. 7, the adhesive 62 is applied and spread into the pocket 60, onto the flexure 40, and onto the side rim of the base plate 42, and thereby the flexure 40 is bonded to the base plate 42 and the load beam 35 with the adhesive 62. In the present embodiment, the adhesive 62 is applied and spread to cover the bridge 51a and the separation groove 51b. Since a part between the extension part 40b and the front end 40a of the flexure 40 is bonded to the base plate 42 and the load beam 35 as described above, swing and oscillation of the extension part 40b due to wind generated by the operation of movable parts, such as the magnetic disks 16 and the spindle motor 18 is prevented. Furthermore, by applying the adhesive 62 to cover the bridge 51a and the separation groove 51b, the bridge 51a is protected from being transformed, and the adhesive 62 and the flexure 40 are further strongly bonded to each other.

In addition, as illustrated in FIG. 1, the HSA 22 includes a support frame extending from the bearing unit 28 in a direction opposite to the arm 32, and a voice coil that constitutes a portion of the VCM 24 is embedded in the support frame. In the state where the HSA 22 configured as described above is integrated onto the base 12, a lower end of the pivot of the bearing unit 28 is firmly attached to the base 12. Thus, the pivot of the bearing unit 28 is disposed parallel to the spindle of the spindle motor 18. Each of the magnetic disks 16 is disposed so that it is positioned between two of the HGAs 30. During operation of the HDD, the magnetic heads 17 attached to the suspensions 34 respectively face an upper surface and a lower surface of the magnetic disk 16 and can read the magnetic disk from the both surface sides. The voice coil firmly attached to the support frame is positioned between a pair of yokes 37 firmly attached onto the base 12. The voice coil, and the yokes 37, and a magnet (not shown in FIG. 1) firmly attached to one of the yokes 37 constitutes the VCM 24.

As illustrated in FIG. 1, the board unit 21 includes a main body 21a formed of a flexible print circuit board, and the main body 21a is firmly attached to the bottom wall 12a of the base 12. On the main body 21a, an electric components (not shown in FIG. 1) such as a head amplifier is mounted. On the bottom surface of the main body 21a, a connector (not shown in FIG. 1) that connects the flexible print circuit board is mounted.

The board unit 21 also includes the main flexible print circuit board (hereinafter main FPC) 21b extending from the main body 21a. An end of the main FPC 21b constitutes a connection part and is firmly attached to the vicinity of the bearing unit 28. The flexures 40 for each of the HGA 30 are mechanically and electrically connected to the connection part of the main FPC 21b. Therefore, the board unit 21 is electrically connected to the magnetic heads 17 and the piezoelectric elements 50 through the main FPC 21b and the flexures 40.

As illustrated in FIG. 1, the ramp load mechanism 25 includes a ramp 47, which is disposed on the bottom wall 12a of the base 12 on an outer periphery of the magnetic disks 16, and tubs 46 (see FIG. 2 and FIG. 3) extending from the tip ends of the suspensions 34. When the HSA 22 revolves around the bearing unit 28 and the magnetic heads 17 move to the evacuation position at the outer periphery of the magnetic disks 16, each of the tubs 46 moves up by following an inclined surface formed on the ramp 47. Thus, the magnetic heads 17 are unloaded from the magnetic disks 16 and are held in the evacuation position.

According to the HGA 30 configured as described above, the piezoelectric elements 50 are disposed on the base plate 42, and a voltage is applied to the piezoelectric elements 50 through the flexures 40. Due to the shrink and extension of the piezoelectric elements 50, the load beam 35 attached to the base plate 42 moves in a direction that the load beam 35 swings. Then, due to the swing of the load beam 35, the magnetic head 17 attached to the load beam 35 can change its position. Thus, by controlling a voltage applied to the piezoelectric elements 50, a position of the magnetic head 17 attached to the load beam 35 can be precisely controlled. Also, a part of the flexure 40 between the front end 40a and the rear part 40b is bonded and firmly attached to the base plate 42 by the adhesive 62. Due to this bonding, even when the flexure 40 receives wind generated by rotation of the magnetic disks 16, it is possible to prevent the flexure 40 from swinging and oscillating. Further, since the flexure 40 is maintained statically, oscillation of the entire part of the suspension 34 is prevented as well. As a result, it is possible to strive to improve the positioning accuracy of the magnetic head 17.

Figure 11:
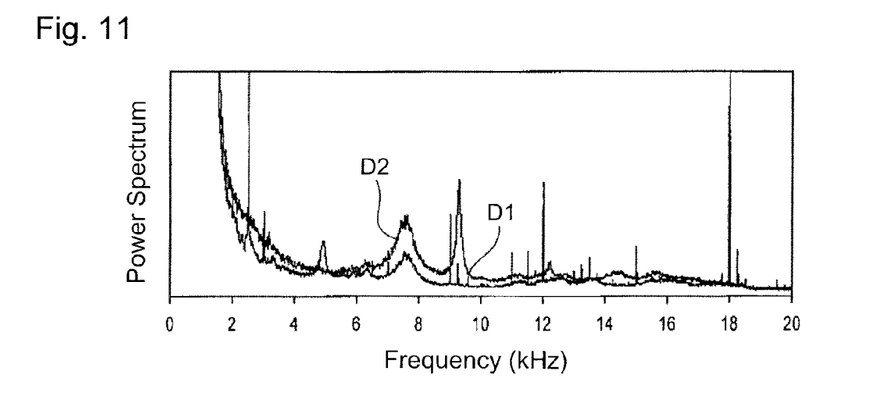
FIG. 11 is a chart that compares the relationship of the oscillation frequency and the power spectrum in a direction of positioning the magnetic head in both cases when the flexure is bonded by an adhesive and when the flexure is not bonded by an adhesive.

FIG. 11 illustrates the relationship of the oscillation frequency and the power spectrum in a direction of positioning the magnetic head 17 in both cases where the flexure 40 is bonded by an adhesive 62 (illustrated by line D1) and where the flexure 40 is not bonded by the adhesive (illustrated by line D2). FIG. 11 shows that the power spectrum with respect to the oscillation frequency drastically reduces in the case where the flexure 40 is bonded to the base plate 12 by the adhesive 62, which is the configuration according to the present embodiment, as compared to the case where the flexure 40 is not bonded to the base plate 12.

Also, in the bonding, by disposing the pocket (clearance) 60 between the base plate 42 and the flexures 40 and injecting the adhesive 62 into the pocket 60, the bond area at which the adhesive 62 contacts with the base plate 42, the flexure 40, and the load beam 35 increases and, therefore, the bond strength is increased. Because the pocket 60 performs as a wall in a planar direction with respect to the adhesive 62, the effect of keeping the adhesive 62 can be effectively held in the pocket 60 between the base plate 42 and the flexure 40 is obtained. Furthermore, because the load beam 35 maintains the clearance in the height direction, the space for injecting the adhesive 62 is secured.

In general, it is difficult to control the amount of the adhesive 62 used for the bonding in a manufacture process. If the amount of the adhesive is insufficient, the binding effect of the adhesive may not be obtainable. On the other hand, if the amount of the adhesive is excessive, that may cause inconvenience in the manufacture process of the head gimbal assembly and the HSA because the excessive adhesive may interfere with the other components. By disposing the pocket 60 to apply the adhesive 62 in it as explained in the present embodiment, an appropriate amount of the adhesive 62 can be applied to a preferred region, resulting in stabilizing the manufacture process.

Next, head gimbal assemblies according to various modified examples of the first embodiment will be explained. In the following modified examples, the same reference numbers are given to portions that are the same as the above-described first embodiment, and detail explanation thereof are omitted.

First Modified Example

Figure 12:
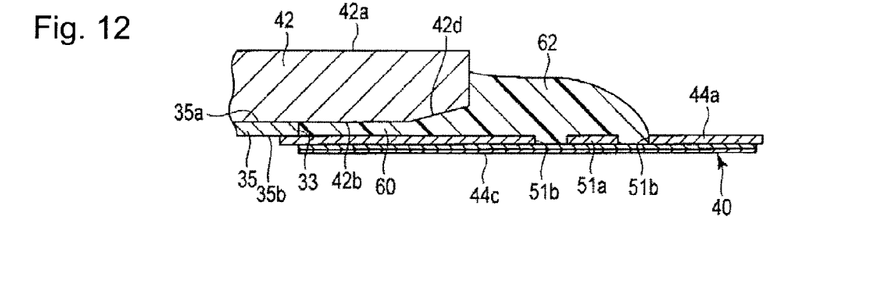
FIG. 12 is an enlarged sectional view of a bonding part of a head gimbal assembly according to a first modified example of the first embodiment.

FIG. 12 shows a sectional view of a bonding part of a head gimbal assembly according to a first modified example. According to the first modified example, a corner part of the base plate 42 on the second surface 42b is chamfered and forms an inclined surface 42d inclining from the second surface 42b toward the side rim of the base plate 42. By forming such inclined surface 42d, an opening of the pocket 60 is widened. Because of this widened opening of the pocket 60, the pocket 60 can be filled with the adhesive 62 in a reliable manner.

Second Modified Example

Figure 13:
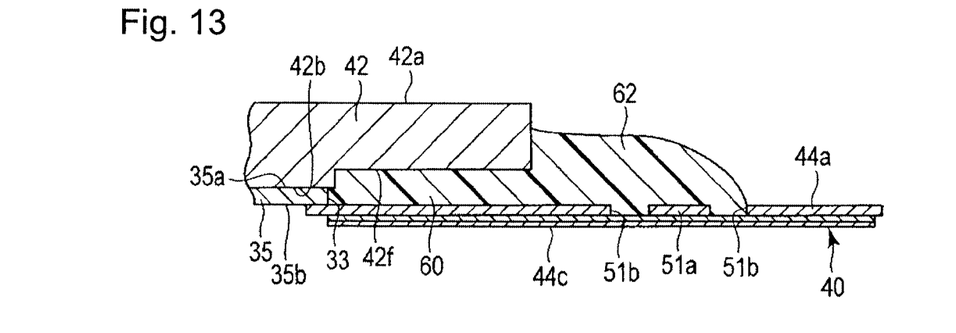
FIG. 13 is an enlarged sectional view of a bonding part of a head gimbal assembly according to a second modified example of the first embodiment.

FIG. 13 shows a sectional view of a bonding part of a head gimbal assembly according to a second modified example. According to the second modified example, a recessed part 42f is formed on the second surface 42b of the base plate 42. The recessed part 42f is disposed to face the recessed part 33 of the load beam 35. Thus, the height (thickness) of the pocket 60 increases. According to the configuration, the space (pocket 60) between the base plate 42 and the flexure 40 is increased and the pocket 60 can be filled with the adhesive 62 in a reliable manner.

Third Modified Example

Figure 14:
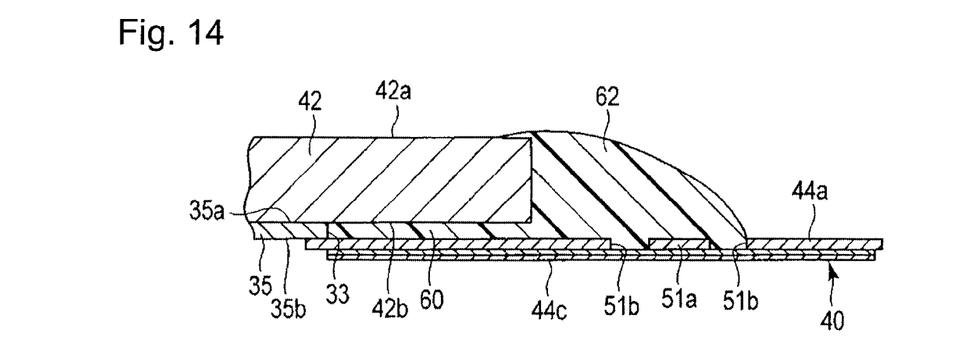
FIG. 14 is an enlarged sectional view of a bonding part of a head gimbal assembly according to a third modified example of the first embodiment.

FIG. 14 shows a sectional view of a bonding part of a head gimbal assembly according to a third modified example. According to the third modified example, the adhesive 62 is applied and spread into the pocket 60, onto the flexure 40, and onto the side rim of the base plate 42. In addition, the adhesive 62 is applied onto the first surface 42a of the base plate 42. Because the area of base plate 42 contacting with the adhesive 62 is larger, bonding between the base plate 42 and the flexure 40 is more robust.

Next, a head gimbal assembly of a HDD according to another embodiment is explained. In the following embodiment, the same reference numbers are given to portions that are the same as the above-described first embodiment, and detail explanation thereof is omitted. Portions different from the first embodiment are mainly explained in detail.

Second Embodiment

Figure 15:
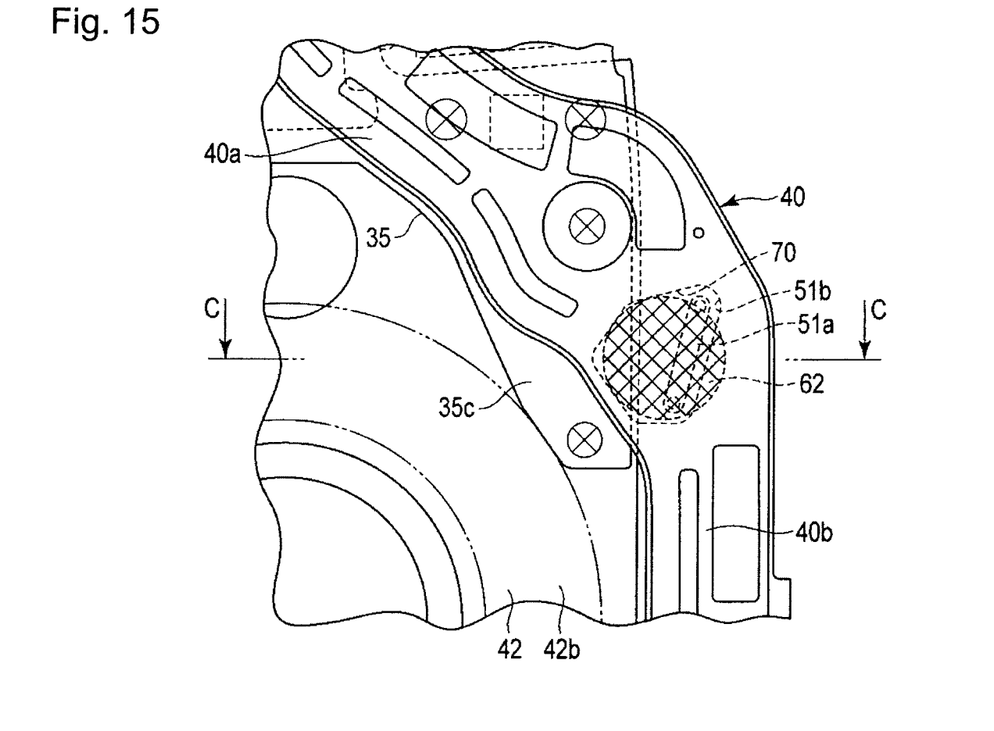
FIG. 15 is an enlarged plan view of a bonding part of a flexure, a base plate, and a load beam in a head gimbal assembly of a HDD according to a second embodiment.
Figure 16:
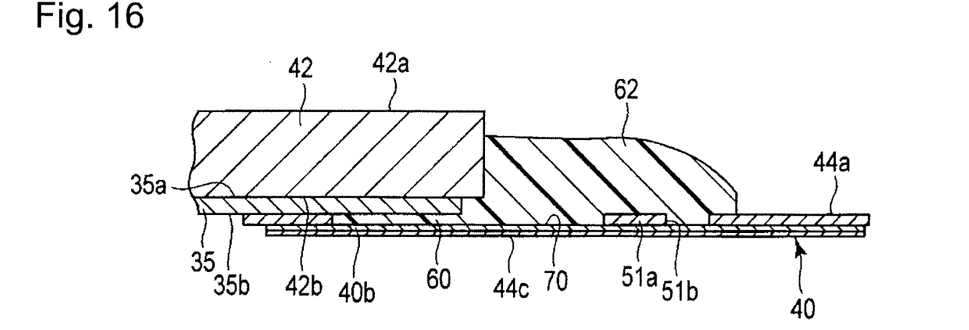
FIG. 16 is a sectional view of the bonding part of the head gimbal assembly along a line C-C shown in FIG. 15.

FIG. 15 is an enlarged plan view of a bonding part of a flexure 40, a base plate 42, and a load beam 35 in a head gimbal assembly of a HDD according to a second embodiment. FIG. 16 shows a sectional view of the bonding part of the head gimbal assembly along the line C-C shown in FIG. 15.

As illustrated in FIG. 15 and FIG. 16, according to the second embodiment, a recessed part 70 formed in the flexure creates a space for a pocket 60 in which an adhesive 62 is to be filled. This recessed part 70 is formed by cutting off a portion of the metal thin plate 44a of the flexure 40. In the metal thin plate 44a, the recessed part 70 is formed in a region where the flexure 40 overlaps with the base plate 42 and the load beam 35 in the vicinity of the side rim of the base plate 42. In the present embodiment, the recessed part 70 is formed over a region including the separation groove 51b. Thus, the separation groove 51b is integrated in the recessed part 70. Due to the recessed part 70, the pocket (crevice) 60 is formed between the insulation layer 44b of the flexure 40 and the second surface 35b of the load beam 35, and this pocket 60 is open toward the side rims of the load beam 35 and the base plate 42. Also, the recessed part 70 extends from the pocket 60 to the bridge 51a and the separation groove 51b.

The adhesive 62 is applied and spread into the pocket 60, into the recessed part 70, and onto the side rim of the base plate 42. Due to the adhesive 62, the flexure 40 is bonded to the load beam 35 and the base plate 42. In the present embodiment, the adhesive 62 is applied and spread to cover the bridge 51a and the separation groove 51b, which is integrated to the recessed part 70.

A part of the flexure 40 between the extension part 40b and the front end 40a is bonded to the base plate 42 and the load beam 35 as described above. Due to this bonding swing and oscillation of the extension part 40b due to windage is prevented. Also, by applying the adhesive 62 to cover the bridge 51a and the separation groove 51b, the bridge 51a is protected from being transformed, and the adhesive 62 and the flexure 40 are strongly bonded to each other.

In the second embodiment, other configurations of the HGA 30 are the same as those of the above-described first embodiment. The same reference numbers are given to the same portions, and detail description thereof is omitted.

According to the HGA and HDD of the second embodiment, since a part of the flexure 40 is bonded to and is firmly fixed to the load beam 35 and the base plate 42 by the adhesive 62 applied in the pocket 60, swing and oscillation of the flexure 40 due to windage is suppressed. Thus, oscillation of an entire part of the suspension 34 is reduced as well. As a result, the accurate positioning of the magnetic head 17 can be achieved.

Further, since the adhesive 62 is injected into the pocket 60, the area at which the adhesive 62 contacts with the base plate 42, the flexure 40, and the load beam 35 increases, and, therefore, the strength of the bonding increases. Because the pocket 60 performs as a wall in a planar direction with respect to the adhesive 62, the adhesive 62 can be effectively filled in the pocket 60 between the load beam 35 and the flexure 40. Furthermore, because the load beam 35 maintains the clearance in the height direction, the space for injecting the adhesive 62 is secured.

In addition, the second embodiment can obtain effects the same as the above-described first embodiment.

While certain embodiments have been described, these embodiments have been presented by way of example only; and are not intended to limit the scope of the inventions. Indeed, the novel embodiments described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirits of the inventions.

In the above-described embodiments, the arms used for the HGAs are formed separately, but the configuration of the arms is not limited to this. A plurality of so-called E block shaped arms and a bearing sleeve may be integrated. The size of the magnetic disk is not limited to 2.5 inches, and a disk having another size may be used as the magnetic disk. The number of the magnetic disks is not limited to two, but may be one or three and more. The number of the HGAs may also be adjusted depending on the number of the magnetic disks. Also, for the material of the adhesive 62, a material of the adhesive 52 that is used to attach the piezoelectric elements to the base plate 42 can be used.

What is claimed is:

1. A head gimbal assembly, comprising:
   a base plate;
   a load beam, a first end of which is supported by the base plate;
   a magnetic head supported at a second end of the load beam;
   a flexure including a plurality of wirings electrically connected to the magnetic head, the flexure extending from a surface of the base plate to an edge of the base plate; and
   an adhesive applied in a space formed between the surface of the base plate and a surface of the flexure facing the surface of the base plate to bond the flexure to the base plate and to bond the flexure to an edge of the load beam.

2. The head gimbal assembly according to claim 1, wherein the load beam is formed between the surface of the base plate and the surface of the flexure and includes a portion that is recessed to define the space.

3. The head gimbal assembly according to claim 2, wherein the base plate has a portion that is recessed to define the space.

4. The head gimbal assembly according to claim 1, wherein the base plate has a portion that is inclined with respect to the surface of the base plate to define the space.

5. The head gimbal assembly according to claim 1, wherein the adhesive is applied on a first surface of the base plate that is opposite to a second surface of the base plate facing the flexure.

6. The head gimbal assembly according to claim 1, wherein a recess is formed on the flexure to define the space.

7. The head gimbal assembly according to claim 6, wherein the flexure has a conductive layer that includes the wirings and a base layer between the conductive layer and the load beam, and
   the recess is formed in the base layer.

8. The head gimbal assembly according to claim 1, further comprising:
   a pair of piezoelectric elements formed on the load beam, and the magnetic head is configured to swing based on movements of the piezoelectric elements.

9. The head gimbal assembly according to claim 8, wherein openings are formed in the base plate and the load beam to mount the piezoelectric elements therein.

10. The head gimbal assembly according to claim 8, wherein
    the flexure has a conductive layer that includes the wirings, a base metal layer between the conductive layer and the load beam, and an insulation layer to insulate the conductive layer and the base metal layer,
    the base metal layer has a bridge, around which the base metal layer is not formed and the insulation layer is exposed, to electrically connect the piezoelectric electric elements, and
    the adhesive is applied on the bridge.

11. A disk device, comprising:
    a recording medium having a disk shape;
    a driving motor configured to rotate the recording medium; and
    a head gimbal assembly including a base plate, a load beam, a first end of which is supported by the base plate, a magnetic head supported at a second end of the load beam, a flexure including a plurality of wirings electrically connected to the head, the flexure extending from a surface of the base plate to an edge of the base plate, and an adhesive applied in a space formed between the surface of the base plate and a surface of the flexure facing the surface of the base plate to bond the flexure to the base plate and to bond the flexure to an edge of the load beam.

12. The disk device according to claim 11, wherein the load beam is formed between the surface of the base plate and the surface of the flexure and includes a portion that is recessed to define the space.

13. The disk device according to claim 12, wherein the base plate has a portion that is recessed to define the space.

14. The disk device according to claim 11, wherein the base plate has a portion that is inclined with respect to the surface of the base plate to define the space.

15. The disk device according to claim 11, wherein the adhesive is applied on a first surface of the base plate that is opposite to a second surface of the base plate facing the flexure.

16. The disk device according to claim 11, wherein a recess is formed on the flexure to define the space.

17. The disk device according to claim 16, wherein the flexure has a conductive layer that includes the wirings and a base layer between the conductive layer and the load beam, and the recess is formed in the base layer.

18. The disk device according to claim 11, further comprising:
a pair of piezoelectric elements formed on the load beam, and the magnetic head is configured to swing based on movements of the piezoelectric elements.

19. The disk device according to claim 18, wherein openings are formed in the base plate and the load beam to mount the piezoelectric elements therein.

20. The disk device according to claim 18, wherein the flexure has a conductive layer that includes the wirings, a base metal layer between the conductive layer and the load beam, and an insulation layer to insulate the conductive layer and the base metal layer, the base metal layer has a bridge, around which the base metal layer is not formed and the insulation layer is exposed, to electrically connect the piezoelectric electric elements, and the adhesive is applied on the bridge.

21. A head gimbal assembly, comprising:
a base plate;
a load beam, a first end of which is supported by the base plate;
a magnetic head supported at a second end of the load beam;
a flexure including a plurality of wirings electrically connected to the magnetic head, the flexure extending from a surface of the base plate to an edge of the base plate; and
an adhesive applied in a space formed between the surface of the base plate and a surface of the flexure facing the surface of the base plate to bond the flexure to the base plate and to an edge of the load beam, wherein
at least a portion of the load beam extends between the surface of the base plate and the surface of the flexure and includes a portion that is recessed to define the space.

* * * * *